(12) United States Patent
Onoe

(10) Patent No.: US 12,237,801 B2
(45) Date of Patent: Feb. 25, 2025

(54) ENGINE GENERATOR

(71) Applicant: HONDA MOTOR CO., LTD., Tokyo (JP)

(72) Inventor: Yuichi Onoe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/225,193

(22) Filed: Jul. 24, 2023

(65) Prior Publication Data

US 2023/0370001 A1 Nov. 16, 2023

Related U.S. Application Data

(63) Continuation of application No. PCT/JP2021/002875, filed on Jan. 27, 2021.

(51) Int. Cl.
*H02P 9/08* (2006.01)
(52) U.S. Cl.
CPC ...................... *H02P 9/08* (2013.01)
(58) Field of Classification Search
CPC ........................................................ H02P 9/08
See application file for complete search history.

(56) References Cited

U.S. PATENT DOCUMENTS

| | | | | |
|---|---|---|---|---|
| 5,561,330 A * | 10/1996 | Crook | ....................... | H02P 9/08 290/31 |
| 6,075,459 A * | 6/2000 | Saarem | ............... | F02N 11/0807 340/12.31 |
| 6,166,525 A * | 12/2000 | Crook | ....................... | H02P 9/08 322/11 |
| 6,392,312 B1 * | 5/2002 | Morris | .................... | F02N 11/10 290/40 C |
| 6,429,539 B1 * | 8/2002 | Suzuki | .................. | H02J 7/1476 290/22 |
| 6,603,097 B2 * | 8/2003 | Leisner | ................ | B23K 9/1006 219/133 |

(Continued)

FOREIGN PATENT DOCUMENTS

| | | |
|---|---|---|
| JP | 2882174 B2 | 4/1999 |
| JP | 5449014 B2 | 3/2014 |

OTHER PUBLICATIONS

International Search Report dated Mar. 16, 2021, issued in counterpart International Application No. PCT/JP2021/002875, with English translation. (5 pages).

*Primary Examiner* — Tulsidas C Patel
*Assistant Examiner* — Thomas K Quigley
(74) *Attorney, Agent, or Firm* — WHDA, LLP

(57) ABSTRACT

A starter starts an engine. A power supply supplies power to the starter. A generator is driven by the engine. An inverter including a first conversion circuit for converting an AC generated by the generator into a DC, and a second conversion circuit for converting the DC into an AC. An outlet outputs the AC from the inverter to a load. A detection circuit detects the load connected to the outlet. A control circuit stops or starts the engine in accordance with the load. The control circuit causes the second conversion circuit to generate an AC by applying a DC voltage from the power supply to the second conversion circuit during an engine-stop-period, and decides, based on whether the detection circuit detects the load, whether to continuously stop the engine or to start the engine.

9 Claims, 6 Drawing Sheets

(56) References Cited

U.S. PATENT DOCUMENTS

| | | | | |
|---|---|---|---|---|
| 7,091,629 B2* | 8/2006 | Hawkins | | H02P 9/08 307/10.6 |
| 7,365,443 B2* | 4/2008 | Gendron | | H02P 11/00 290/31 |
| 7,989,969 B2* | 8/2011 | Grant | | F02B 63/047 439/500 |
| 8,618,681 B2* | 12/2013 | Yamamura | | H02P 9/107 290/40 C |
| 8,890,492 B2 | 11/2014 | Ueno et al. | | |
| 8,987,638 B2* | 3/2015 | Hiroi | | B23K 9/1043 219/137 PS |
| 9,231,499 B2* | 1/2016 | Yamoto | | F02D 17/04 |
| 10,124,794 B2* | 11/2018 | Akuzawa | | F02N 11/0862 |
| 10,612,509 B2* | 4/2020 | Boyko | | B60K 6/387 |
| 10,745,013 B1* | 8/2020 | Herhusky | | F02D 33/006 |
| 11,105,279 B2* | 8/2021 | Koenen | | F02N 11/0818 |
| 11,260,740 B2* | 3/2022 | Kanda | | F02N 11/0818 |
| 11,519,376 B2* | 12/2022 | Koenen | | F02D 29/06 |
| 11,585,307 B2* | 2/2023 | Chen | | F02N 11/0862 |
| 2004/0262995 A1* | 12/2004 | Hawkins | | H02P 9/08 307/10.6 |
| 2007/0296379 A1* | 12/2007 | Gendron | | H02P 9/08 322/37 |
| 2008/0197630 A1* | 8/2008 | Wakitani | | H02J 9/062 290/2 |
| 2009/0206660 A1* | 8/2009 | Makita | | H02J 7/1423 307/9.1 |
| 2009/0295158 A1* | 12/2009 | Yuri | | F01K 23/065 165/219 |
| 2011/0313584 A1* | 12/2011 | Carson | | H02P 9/04 700/295 |
| 2012/0193988 A1* | 8/2012 | Eschrich | | H02J 9/062 307/66 |
| 2012/0292920 A1* | 11/2012 | Yamamura | | H02P 27/08 290/40 B |
| 2013/0289854 A1* | 10/2013 | Takahashi | | B60L 53/00 701/112 |
| 2014/0067241 A1* | 3/2014 | Yuhara | | F02N 11/0825 701/112 |
| 2014/0312626 A1* | 10/2014 | Yamoto | | H02J 7/1469 290/40 R |
| 2014/0319911 A1* | 10/2014 | Alexander | | H02J 9/062 307/22 |
| 2015/0311799 A1* | 10/2015 | Okaniwa | | B60L 58/20 323/271 |
| 2018/0183113 A1* | 6/2018 | Moteki | | F02N 11/0866 |
| 2020/0072176 A1* | 3/2020 | Boyko | | F02N 11/08 |
| 2020/0173412 A1* | 6/2020 | Meroux | | G06Q 30/0283 |
| 2020/0271066 A1* | 8/2020 | Zur Loye | | F02N 11/08 |
| 2021/0199082 A1* | 7/2021 | Chen | | F02N 11/0862 |
| 2021/0276407 A1* | 9/2021 | Kanda | | F02N 11/0862 |
| 2022/0153138 A1* | 5/2022 | Dalum | | B60K 25/06 |
| 2024/0047991 A1* | 2/2024 | Caamano | | H02J 3/40 |

* cited by examiner

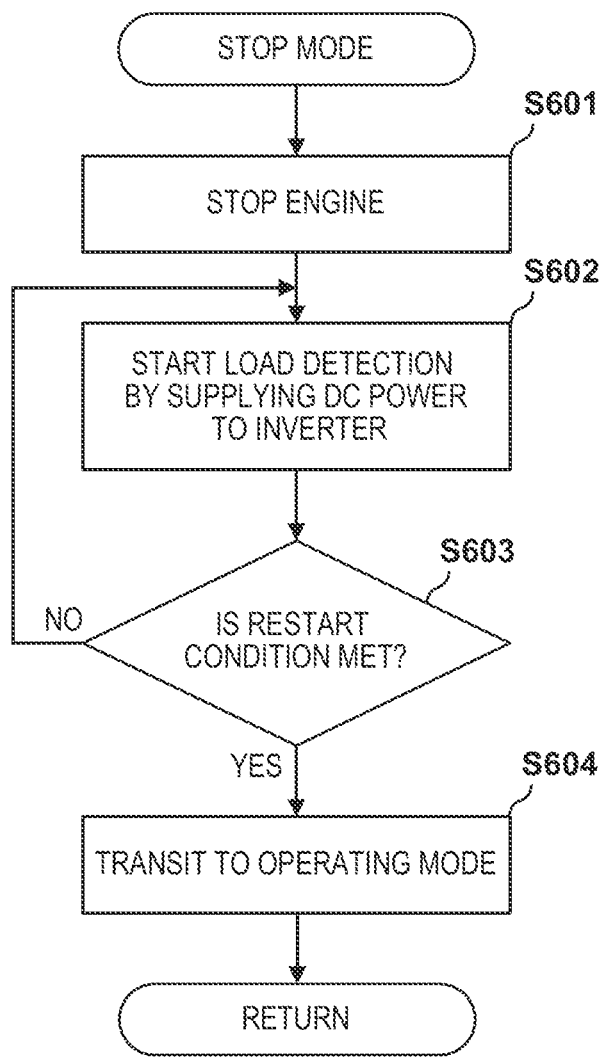

ENGINE GENERATOR

CROSS-REFERENCE TO RELATED APPLICATION(S)

This application is a continuation of International Patent Application No. PCT/JP2021/002875 filed on Jan. 27, 2021, the entire disclosures of which is incorporated herein by reference.

BACKGROUND OF THE INVENTION

Field of the Invention

The present disclosure relates to an engine generator.

Description of the Related Art

An engine generator (engine-driven generator) can be carried by a user, and is widely used as a power supply for leisure and emergency. A load connected to the engine generator may stop or may be disconnected from the engine generator. Even during a period in which the load stops or is not connected, the engine continues rotating at an idle rotation speed, thereby unnecessarily consuming fuel. Japanese Patent No. 5449014 proposes that a generator (that is, an engine) is automatically activated or stopped in accordance with the presence/absence of a load.

During a period in which an engine stops, a generator also stops. Therefore, the invention of Japanese Patent No. 5449014 adopts a load detection circuit that detects a load by applying a DC voltage from a DC power supply to the load. However, in the invention of Japanese Patent No. 5449014, it is difficult to detect a load with a high impedance.

SUMMARY OF THE INVENTION

The present disclosure provides an engine generator includes: an engine; a starter configured to start the engine; a power supply configured to supply power to the starter; a generator configured to be driven by the engine to generate power; an inverter including a first conversion circuit configured to convert an alternative current (AC) generated by the generator into a direct current (DC), and a second conversion circuit configured to convert the DC into an AC and supply the AC to a load; an outlet configured to output the AC from the inverter to the load; a detection circuit configured to detect the load connected to the outlet; and a control circuit configured to stop or start the engine in accordance with the load detected by the detection circuit, wherein the control circuit is configured to cause the second conversion circuit to generate an AC by applying a DC voltage from the power supply to the second conversion circuit during a period in which the engine stops, and decide, based on whether the detection circuit detects the load, whether to continuously stop the engine or to start the engine.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 6 is a flowchart illustrating a stop mode.

DESCRIPTION OF THE EMBODIMENTS

Figure 1:
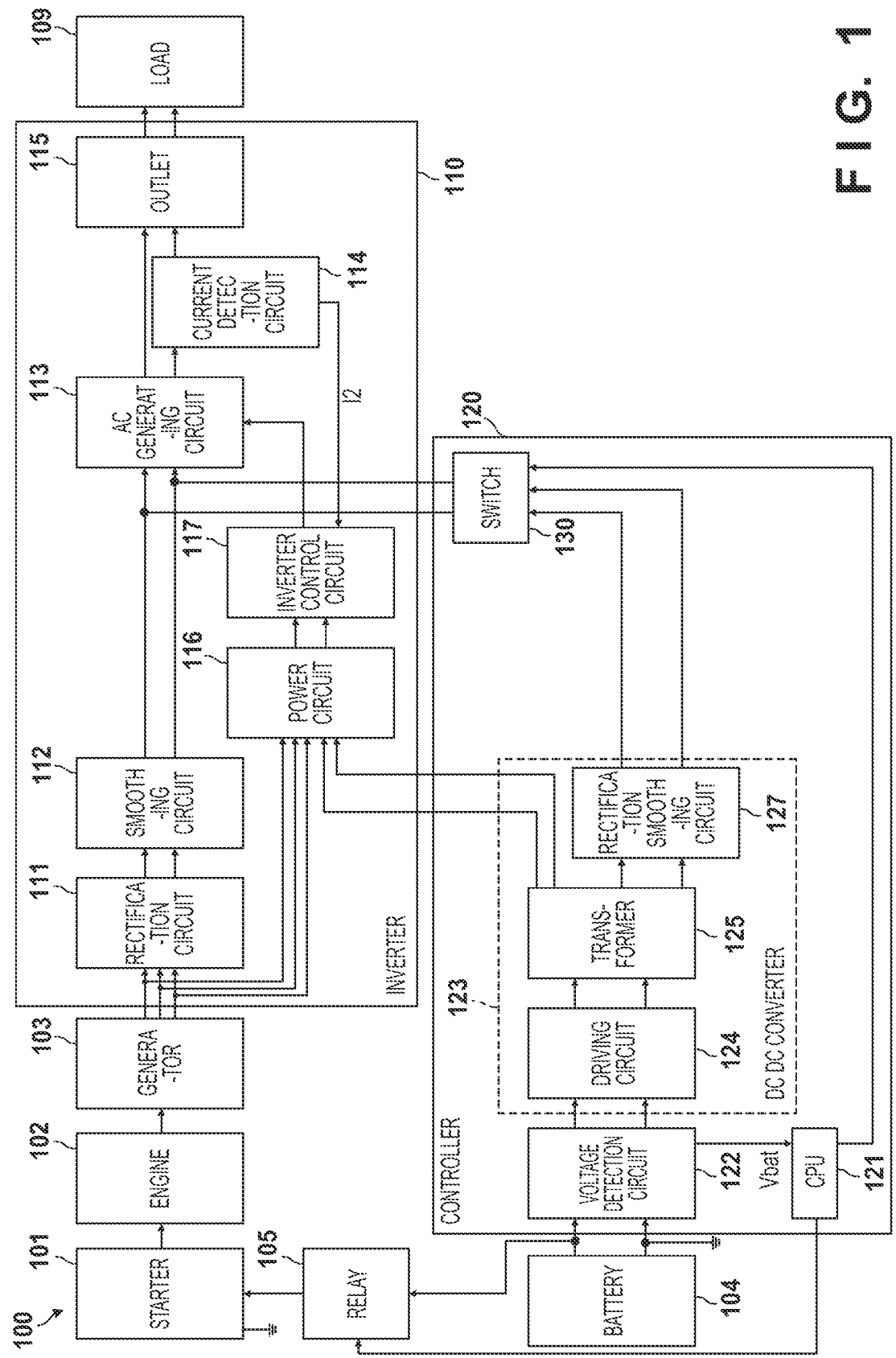
FIG. 1 is a block diagram for explaining an engine generator.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In an engine generator 100 shown in FIG. 1, a starter 101 is connected to a crank shaft of an engine 102. When the starter 101 rotates the crank shaft, the engine 102 starts. The engine 102 burns fuel (for example, gasoline, natural gas, or hydrogen) in a cylinder. The crank shaft (output shaft) rotates in synchronism with a piston that reciprocally moves in the cylinder. The rotor of a generator 103 is connected to the crank shaft. When the rotor rotates, the generator 103 generates power. The stator of the generator 103 includes a U winding, a V winding, and a W winding. The U winding, the V winding, and the W winding are connected to a rectification circuit 111 in an inverter 110. The rectification circuit 111 and a smoothing circuit 112 serve as a conversion circuit that converts an AC generated by the generator 103 into a DC. More specifically, the rectification circuit 111 rectifies an AC generated in the U winding, the V winding, and the W winding, thereby generating a pulsating current. The rectification circuit 111 may be formed by a bridge circuit including a plurality of rectification elements (for example, diodes, thyristors, or transistors). The smoothing circuit 112 smooths the pulsating current to generate a DC. The smoothing circuit 112 can be formed by, for example, an electrolytic capacitor or the like. The smoothed DC voltage may be called a DC link voltage or a DC bus voltage. The DC voltage (DC bus voltage) output from the smoothing circuit 112 is input to an AC generating circuit 113. An AC voltage generated by the AC generating circuit 113 is supplied from an outlet 115 to a load 109.

An inverter control circuit 117 controls the AC generating circuit 113 in accordance with a load current I2 detected by a current detection circuit 114. The inverter control circuit 117 may be formed by hardware components such as a CPU (Central Processing Unit), an ASIC (Application-Specific Integrated Circuit), and a memory. The function of the inverter control circuit 117 to be described below may be implemented when the CPU executes a control program stored in the memory. If the load current I2 becomes zero, the inverter control circuit 117 stops the AC generating circuit 113. The AC generating circuit 113 is formed by, for example, a half-bridge circuit or a full-bridge circuit including a plurality of FETs (Field Effect Transistors). In this case, the inverter control circuit 117 maintains the AC voltage at a target voltage by controlling the ON period of a control signal (driving signal) supplied to the gate of each FET. The inverter control circuit 117 may transmit the value of the load current I2 to a controller 120. A power circuit 116 converts a voltage supplied from the generator 103 or a DC DC converter 123 to generate an operating voltage of the inverter control circuit 117. More specifically, during a period in which the engine 102 rotates, the power circuit 116 converts an AC generated by the generator 103 to generate a DC. During a period in which the engine 102 stops, the power circuit 116 converts an AC generated in a secondary winding of a transformer 125 of the DC DC converter 123 to generate a DC.

The controller 120 rotates or stops the starter 101 by switching ON/OFF of a relay 105. A battery 104 is a battery that supplies a DC voltage to the starter 101 via the relay 105. The battery 104 may be charged by power generated by the generator 103. This charging circuit is well known and is thus not illustrated in FIG. 1.

The DC DC converter 123 is a conversion circuit that lowers or raises a battery voltage Vbat supplied from the battery 104 to generate an operating voltage of each of the power circuit 116 and a CPU 121. The DC DC converter 123 is a conversion circuit that raises the battery voltage Vbat to generate a pseudo DC bus voltage. In the DC DC converter 123, a driving circuit 124 is a circuit that is connected to the primary winding of the transformer 125, and switches a voltage to be applied to the primary winding. The transformer 125 includes the primary winding and two secondary windings. The power circuit 116 is connected to one of the secondary windings of the transformer 125, and an AC generated in this secondary winding is supplied to the power circuit 116. The power supply voltage of the CPU 121 may be generated by converting the battery voltage Vbat by the DC DC converter 123 or a DC DC converter (not shown). A rectification smoothing circuit 127 is connected to the other secondary winding of the transformer 125, generates a DC voltage (pseudo DC bus voltage) by rectifying and smoothing an AC generated in this secondary winding, and applies this DC voltage to the input of the AC generating circuit 113 via a switch 130. The level of the DC voltage is a level sufficient for the AC generating circuit 113 to generate an AC. The CPU 121 turns on the switch 130 in a state in which the engine 102 stops, and turns off the switch 130 in a state in which the engine 102 rotates. That is, during the stop period of the engine 102, the AC generating circuit 113 is supplied with a DC voltage from the DC DC converter 123. During the operating period of the engine 102, the AC generating circuit 113 is supplied with a DC voltage from the generator 103, the rectification circuit 111, and the smoothing circuit 112. The switch 130 may be a semiconductor switch (transistor), a relay, or a diode.

The CPU 121 is a central processing unit (processor circuit) that controls the relay 105 and the switch 130 by executing a control program. The CPU 121 may be formed by a single processor circuit, a plurality of processor circuits, an ASIC (Application-Specific Integrated Circuit), or an FPGA (Field Programmable Gate Array). The engine generator 100 has a generating mode (operating mode) in which the engine 102 rotates and the generator 103 generates power, and a stop mode in which the engine 102 stops and the generator 103 generates no power. If a stop condition is met, the CPU 121 stops the engine 102. For example, the engine 102 stops by cutting power supplied to a fuel pump (not shown). The stop condition may be that, for example, the load current I2 is smaller than a predetermined threshold. Alternatively, the stop condition may be that, for example, the load current I2 is smaller than the predetermined threshold and the battery voltage Vbat is equal to or higher than a predetermined threshold. If the battery voltage Vbat is lower than the predetermined threshold (if charging is insufficient), the CPU 121 may not be able to detect the load 109 during the stop period (stop mode) in which the engine 102 stops or to start the engine 102 by the starter 101. Therefore, after the battery 104 is sufficiently charged by the generator 103, the CPU 121 may stop the engine 102.

Load Detection Method I

Referring to FIG. 1, if a restart condition of the engine 102 is met, the CPU 121 operates the starter 101 by switching the switch 130 from ON to OFF and also switching the relay 105 from OFF to ON, thereby restarting the engine 102. Note that the timing of switching the switch 130 from ON to OFF may be after a DC bus voltage Vdc output from the smoothing circuit 112 reaches a target voltage and is thus stable. The restart condition may be that the battery voltage Vbat is lower than the predetermined threshold. As shown in FIG. 1, while the engine 102 stops, the rectification smoothing circuit 127 generates a DC voltage and supplies it to the AC generating circuit 113, and the AC generating circuit 113 generates an AC and supplies it to the load 109. Therefore, if the load 109 is connected to the outlet 115 while the engine 102 stops, a load current flows into the load 109, thereby lowering the battery voltage Vbat. To cope with this, by monitoring the battery voltage Vbat while the engine 102 stops, the CPU 121 can detect or recognize that the load 109 is connected to the outlet 115.

Load Detection Method II

Figure 2:
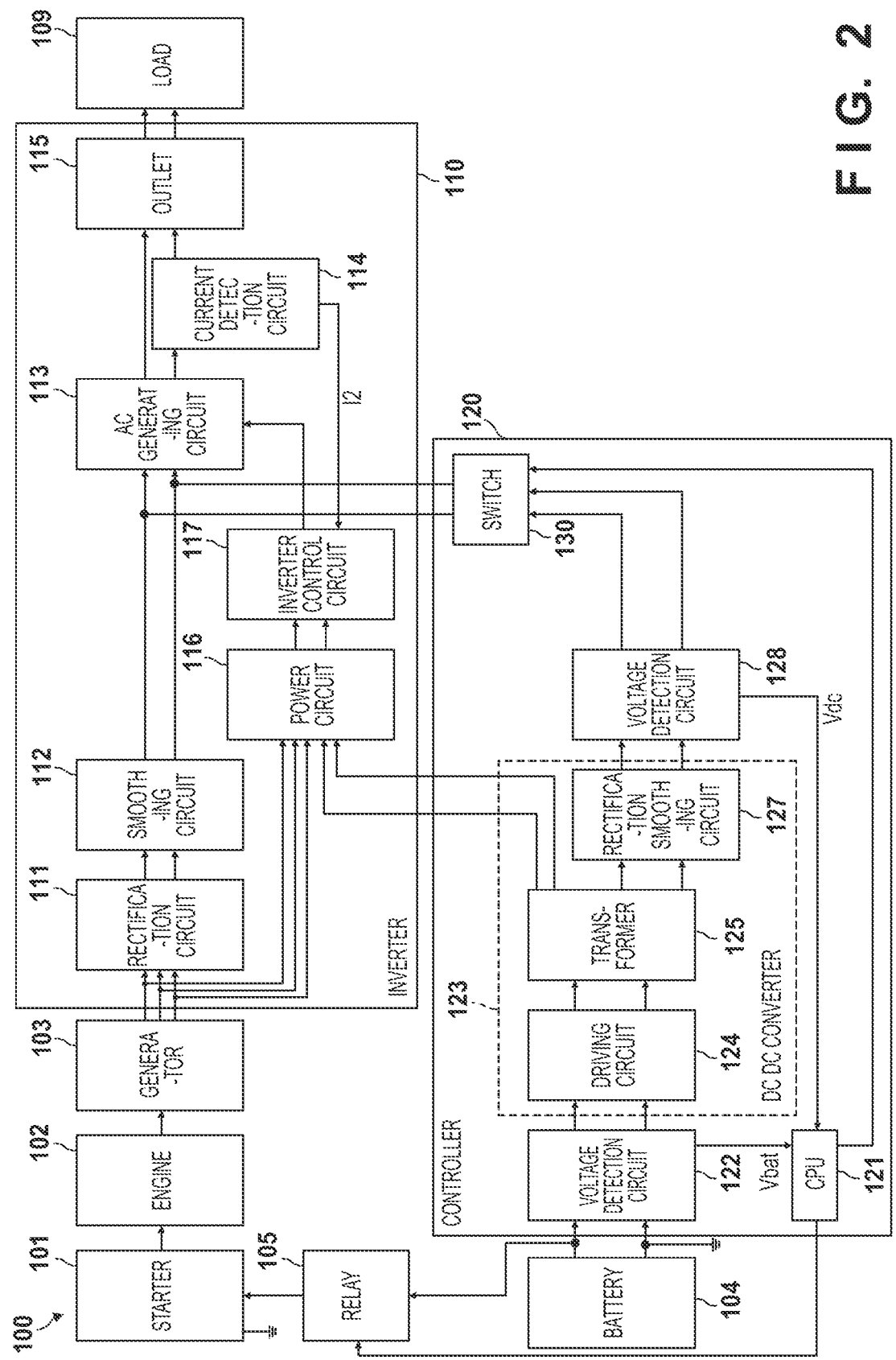
FIG. 2 is a block diagram for explaining the engine generator.

FIG. 2 shows a state in which the load 109 is detected based on a change in the pseudo DC bus voltage Vdc supplied from the DC DC converter 123 to the AC generating circuit 113. In FIG. 2, the same reference numerals as in FIG. 1 denote common components and the above description thereof will be referred to. If the load 109 is connected to the outlet 115 while the engine 102 stops, a load current flows into the load 109, thereby lowering the DC bus voltage Vdc. By monitoring the DC bus voltage Vdc while the engine 102 stops, the CPU 121 can detect or recognize that the load 109 is connected to the outlet 115. As shown in FIG. 2, a voltage detection circuit 128 is connected between the output terminal of the rectification smoothing circuit 127 and the input terminal of the AC generating circuit 113. Therefore, the voltage detection circuit 128 detects the pseudo DC bus voltage Vdc supplied from the rectification smoothing circuit 127 to the AC generating circuit 113, and reports the DC bus voltage Vdc to the CPU 121. In fact, a detected voltage proportional to the DC bus voltage Vdc is applied to the port of the CPU 121 via a photocoupler or the like. If the DC bus voltage Vdc is lower than the predetermined threshold, the CPU 121 determines that the restart condition is met, and switches the relay 105 from OFF to ON. If the DC bus voltage Vdc is equal to higher than predetermined threshold, the CPU 121 determines that the restart condition is not met, and maintains the relay 105 in the OFF state.

Load Detection Method III

Figure 3:
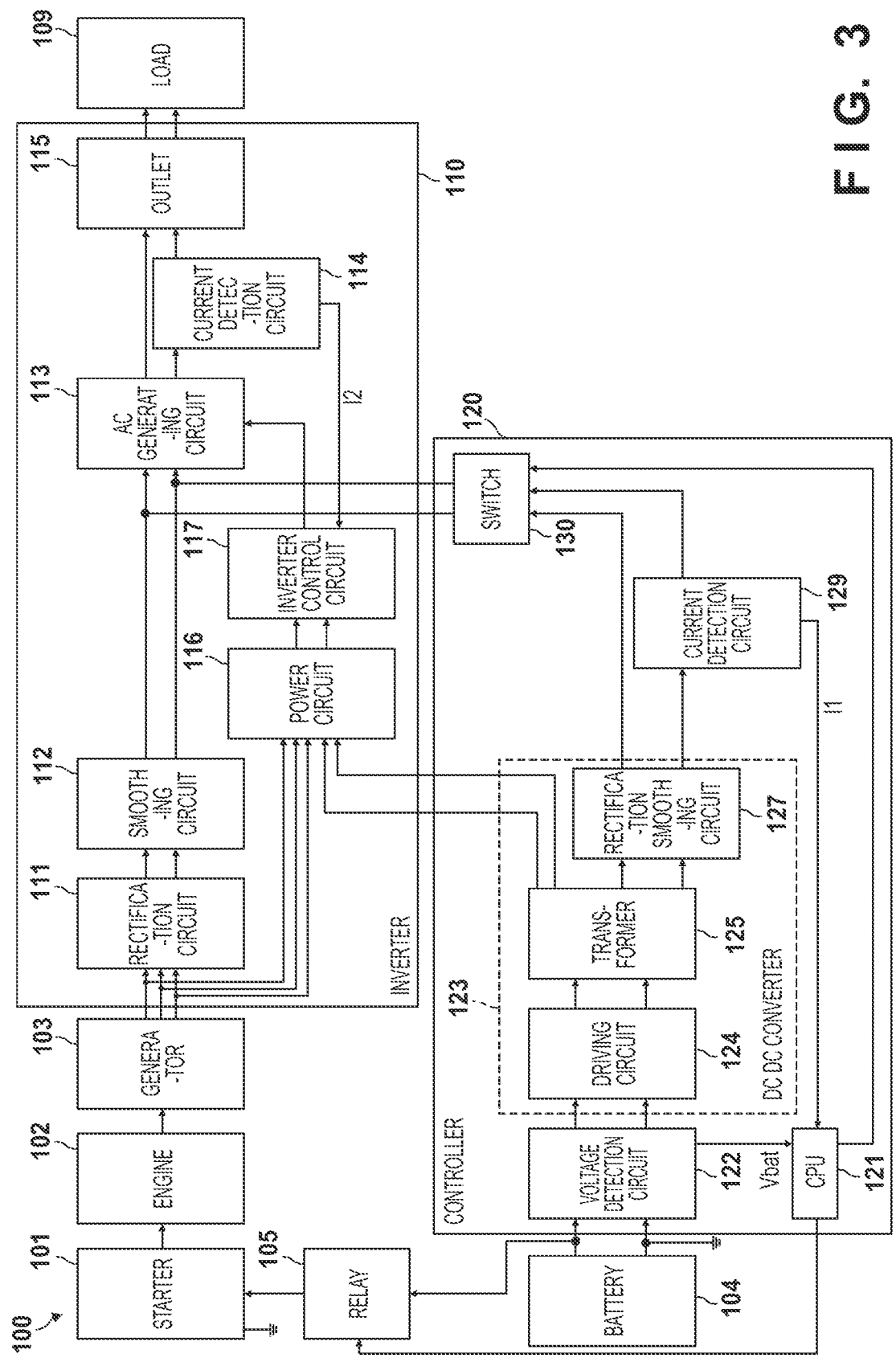
FIG. 3 is a block diagram for explaining the engine generator.

FIG. 3 shows a state in which the load 109 is detected by inputting the pseudo DC bus voltage Vdc to the AC generating circuit 113 while the engine 102 stops and monitoring a current flowing to the input side of the AC generating circuit 113. In FIG. 3, the same reference numerals as in FIG. 1 or 2 denote common components and the above description thereof will be referred to. If the load 109 is connected to the outlet 115 while the engine 102 stops, the load current I2 flows into the load 109. If the load current I2 flows into the load 109, a current (input-side current I1) flowing from the DC DC converter 123 to the input of the AC generating circuit 113 also increases. Thus, the CPU 121 detects the input-side current I1 by a current detection circuit 129, and detects or recognize, based on a change in the input-side current I1, that the load 109 is connected to the outlet 115 while the engine 102 stops. For example, the restart requirement may be that the input-side current I1 is equal to or larger than a predetermined threshold.

Load Detection Method IV

Figure 4:
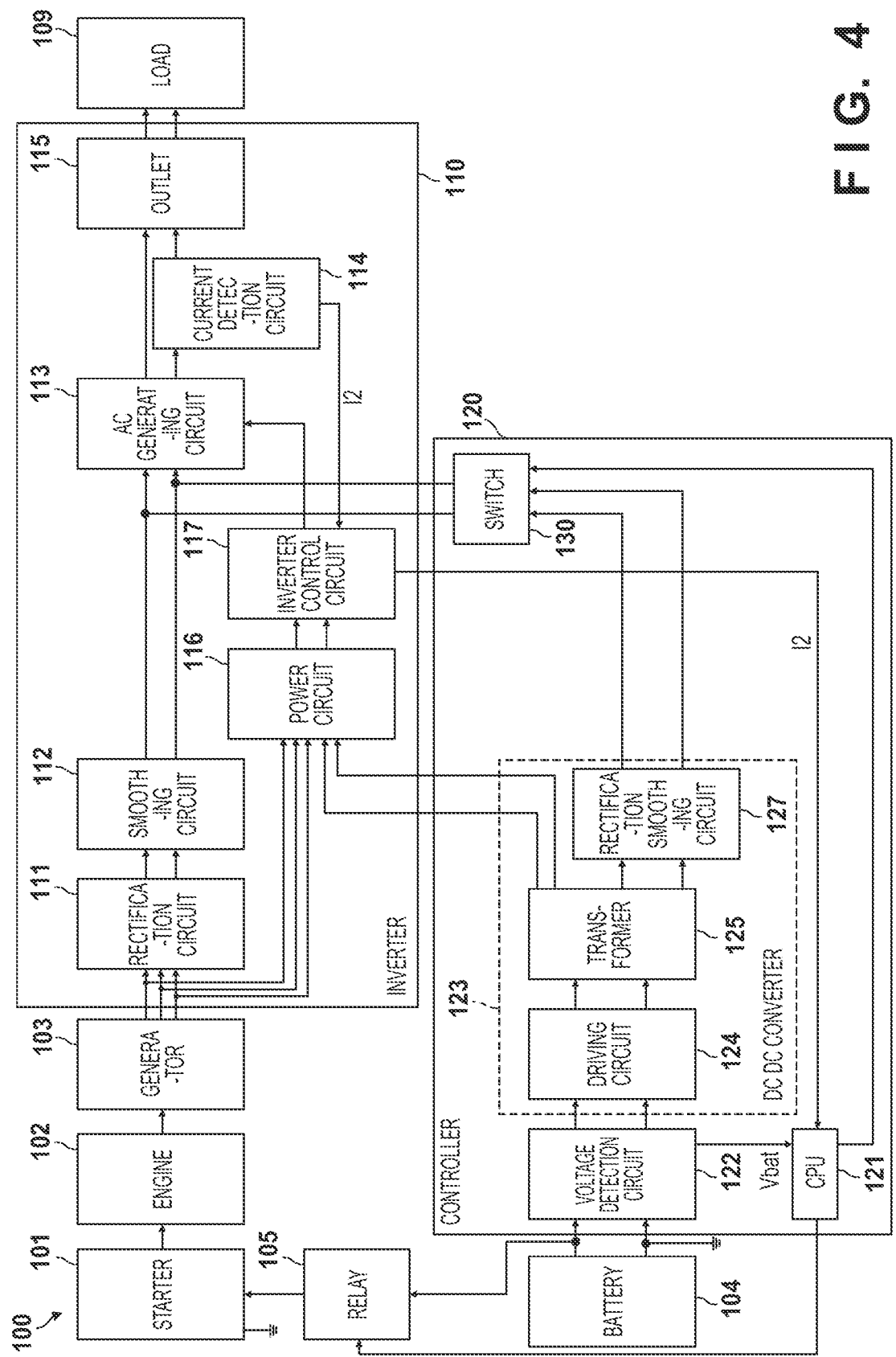
FIG. 4 is a block diagram for explaining the engine generator.

FIG. 4 shows a state in which the load 109 is detected by inputting the pseudo DC bus voltage Vdc to the AC generating circuit 113 while the engine 102 stops and monitoring the load current I2 flowing from the AC generating circuit 113 to the load 109. In FIG. 4, the same reference numerals as in each of FIGS. 1 to 3 denote common components and the above description thereof will be referred to. If the load 109 is connected to the outlet 115 while the engine 102 stops, the load current I2 flows into the load 109. The current detection circuit 114 is connected between the AC generating circuit 113 and the load 109, and can detect the load current I2. The inverter control circuit 117 and the CPU 121 are connected via an insulated communication circuit (for example, a photocoupler or the like). The inverter control circuit 117 notifies the CPU 121 of the value of the load current I2 via the insulated communication circuit. The CPU 121 detects or recognizes, based on a change in the load current I2, that the load 109 is connected to the outlet 115 while the engine 102 stops. For example, the restart requirement may be that the load current I2 is equal to or larger than a predetermined threshold.

Flowchart

Figure 5:
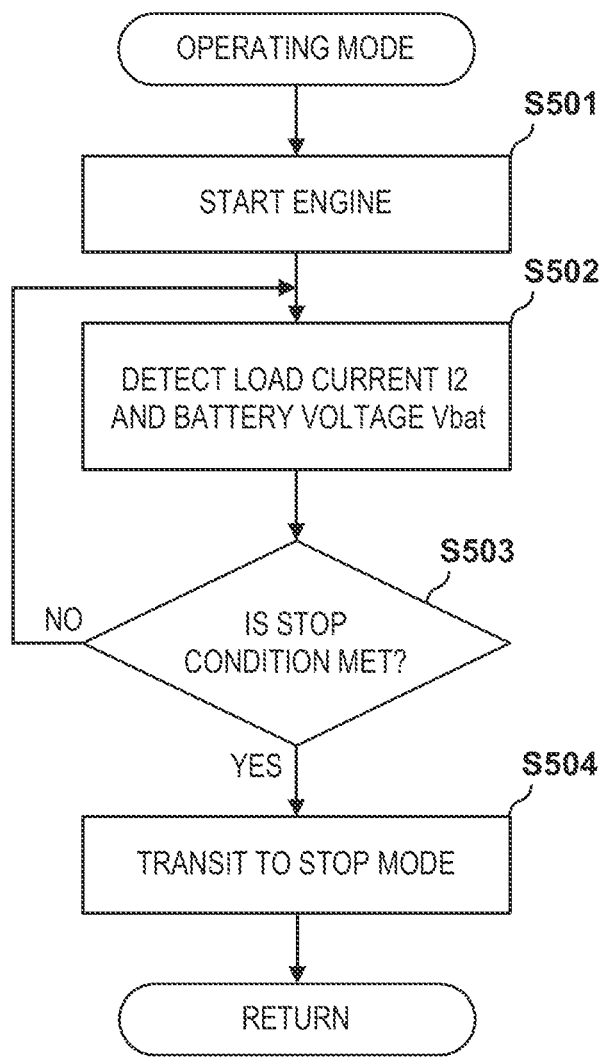
FIG. 5 is a flowchart illustrating an operating mode.

FIG. 5 is a flowchart illustrating the operating mode.

In step S501, the CPU 121 starts the engine 102. For example, the CPU 121 turns on the relay 105 to connect the battery 104 to the starter 101, and rotates the starter 101. This causes the engine 102 to start rotating.

In step S502, the CPU 121 detects the load current I2 and the battery voltage Vbat. The load current I2 is detected by the current detection circuit 114, and input to the CPU 121 via the inverter control circuit 117.

In step S503, based on the load current I2 and the battery voltage Vbat, the CPU 121 determines whether the stop condition is met. For example, if the load current I2 is smaller than a threshold Ith1 and the battery voltage Vbat is equal to or higher than Vth1, the CPU 121 determines that the stop condition is met. If the load 109 is disconnected from the outlet 115 or the load 109 stops, the load current I2 is smaller than the threshold Ith1. If the load current I2 is equal to or larger than the threshold Ith1, the CPU 121 determines that the stop condition is not met. If the battery voltage Vbat is lower than Vth1, the CPU 121 also determines that the stop condition is not met. If the stop condition is not met, the CPU 121 returns to step S502. If the stop condition is met, the CPU 121 advances to step S504.

In step S504, the CPU 121 transits from the operating mode (generating mode) to the stop mode.

FIG. 6 is a flowchart illustrating the stop mode.

In step S601, the CPU 121 stops the engine 102. For example, the CPU 121 switches the relay 105 from ON to OFF. Furthermore, the CPU 121 stops the engine 102 by stopping fuel supply to the engine 102.

In step S602, the CPU 121 supplies a DC voltage to the inverter 110, thereby starting detection of the load 109. For example, the CPU 121 turns on the switch 130 to apply the pseudo DC bus voltage generated by the DC DC converter 123 to the input bus of the AC generating circuit 113. This causes the AC generating circuit 113 to start generation of an AC based on the pseudo DC bus voltage. Furthermore, to detect that the load 109 is connected to the outlet 115, the CPU 121 periodically monitors the battery voltage Vbat, a DC bus voltage Vbus, the input-side current I1, and the load current I2. A state in which the load 109 is electrically connected to the outlet 115 is equivalent to a state in which the load 109 physically connected to the outlet 115 is switched from the stop state to the operating state. That is, even in a case where the load 109 is physically connected to the outlet 115, the load 109 may not electrically be connected to the engine generator 100. For example, there is a case where the power plug of the load 109 is connected to the outlet 115 but the power switch of the load 109 is OFF. Therefore, a state in which the load 109 is connected to the engine generator 100 (outlet 115) generally indicates a state in which the load 109 is electrically connected to the outlet 115.

In step S603, the CPU 121 determines whether the restart condition is met. For example, if the battery voltage Vbat is lower than a predetermined threshold Vth2, the CPU 121 may determine that the restart condition is met. Alternatively, if the DC bus voltage Vbus is lower than a predetermined threshold Vth3, the CPU 121 may determine that the restart condition is met.

Alternatively, if the input-side current I1 is equal to or larger than a predetermined threshold Ith2, the CPU 121 may determine that the restart condition is met. Alternatively, if the load current I2 is equal to or larger than a predetermined threshold Ith3, the CPU 121 may determine that the restart condition is met. Alternatively, the restart condition may be that two of the four conditions are met, three of the four conditions are met, or all the four conditions are met. If the restart condition is not met, the CPU 121 returns to step S602. If the restart condition is met, the CPU 121 advances to step S604.

In step S604, the CPU 121 transits to the operating mode. That is, the CPU 121 advances to step S501, and restarts the engine 102.

According to the present invention, it is possible to accurately restart an engine by making it possible to detect even a load with a high impedance.

Summary

[Aspect 1]

As shown in FIG. 1 and the like, the battery 104 is an example of a power supply (for example, a DC power supply or secondary battery) for supplying power to the starter 101 that starts the engine. The generator 103 is an example of a generator that is driven by the engine 102 to generate power. The inverter 110 is an example of an inverter including a first conversion circuit (for example, the rectification circuit 111 and the smoothing circuit 112) that converts an AC generated by the generator 103 into a DC, and a second conversion circuit (for example, the AC generating circuit 113) that converts a DC into an AC and supplies it to the load. The outlet 115 is an example of an outlet that outputs an AC from the inverter 110 to the load 109. The current detection circuits 114 and 129, a voltage detection circuit 122, and the voltage detection circuit 128 are examples of a detection circuit that detects the load 109 connected to the outlet 115. The controller 120 and the CPU 121 are examples of a control circuit that stops or starts the engine 102 in accordance with the load detected by the detection circuit. The control circuit (for example, the CPU 121) is configured to cause the second conversion circuit to generate an AC by applying a DC voltage from the power supply to the second conversion circuit during a period in which the engine 102 stops. Furthermore, the control circuit (for example, the CPU 121) is configured to decide, based on whether the detection circuit detects the load, whether to continuously stop the engine 102 or to start the engine 102. According to this embodiment, the CPU 121 can detect not only the load 109 with a low impedance but also the load 109 with a high impedance by outputting an AC from the outlet 115 during the stop period of the engine 102. This enables the CPU 121 to accurately detect that the load 109 is connected during the stop period of the engine 102, thereby accurately restarting the engine 102. Furthermore, the detection accuracy of the load 109 is improved, and thus the stop state of the engine 102 can be maintained accurately. This can reduce fuel consumption by the engine 102.

[Aspect 2]

The voltage detection circuit 128 is an example of a voltage detection circuit that detects a voltage input to the second conversion circuit. The control circuit (for example, the CPU 121) may be configured to decide, based on a change in the input voltage to the second conversion circuit, which is detected by the voltage detection circuit, whether to continuously stop the engine 102 or to start the engine 102 during the stop period of the engine 102. If the load 109 is connected to the outlet 115, a current flows from the second conversion circuit to the load 109, and thus the input voltage to the second conversion circuit lowers. That is, by monitoring a change in the input voltage to the second conversion circuit, it is possible to accurately detect connection of the load 109 to the outlet 115.

[Aspect 3]

The voltage detection circuit 122 is an example of a voltage detection circuit that detects the power supply voltage (for example, Vbat) of the power supply. The control circuit (for example, the CPU 121) may decide, based on a change in the power supply voltage detected by the voltage detection circuit, whether to continuously stop the engine or to start the engine during the stop period of the engine 102. If the load 109 is connected to the outlet 115, a current flows from the second conversion circuit to the load 109, and thus the voltage (power supply voltage) between the terminals of the battery 104 lowers. That is, by monitoring a change in the power supply voltage of the battery 104, it is possible to accurately detect connection of the load 109 to the outlet 115.

[Aspect 4]

The current detection circuit 129 is an example of a current detection circuit that detects a current flowing from the power supply to the second conversion circuit. The control circuit (for example, the CPU 121) applies a DC voltage from the power supply to the second conversion circuit to cause the second conversion circuit to generate an AC during a period in which the engine 102 stops. The control circuit (for example, the CPU 121) may decide, based on a change in the current detected by the current detection circuit, whether to continuously stop the engine 102 or to start the engine 102. If the load 109 is connected to the outlet 115 by applying an AC voltage to the outlet 115, a current flows from the power supply (for example, the battery 104 and the DC DC converter 123) to the second conversion circuit. Therefore, by monitoring this current, the CPU 121 can accurately detect that the load 109 is connected to the outlet 115 during the stop period of the engine 102.

[Aspect 5]

The current detection circuit 114 is an example of a current detection circuit that detects a current flowing from the second conversion circuit to the load 109. The control circuit (for example, the CPU 121) applies a DC voltage from the power supply to the second conversion circuit to cause the second conversion circuit to generate an AC during a period in which the engine 102 stops. The control circuit (for example, the CPU 121) may decide, based on a change in the current detected by the current detection circuit, whether to continuously stop the engine 102 or to start the engine 102. If the load 109 is connected to the outlet 115 by applying an AC voltage to the outlet 115, a current flows from the second conversion circuit to the load 109. Therefore, by monitoring this current, the CPU 121 can accurately detect that the load 109 is connected to the outlet 115 during the stop period of the engine 102.

[Aspect 6]

The DC DC converter 123 is an example of a third conversion circuit that is provided between the power supply and the second conversion circuit, and converts a DC power supply voltage supplied from the power supply into a DC input voltage to the second conversion circuit. The DC input voltage to the second conversion circuit (for example, the AC generating circuit 113) is such DC voltage that the second conversion circuit can generate an AC by that the second conversion circuit is inputted or supplied with the DC input voltage. There may be a lower limit voltage with respect to the input voltage to the third conversion circuit, which is necessary for the third conversion circuit to output an AC voltage. In this case, the DC input voltage input to the second conversion circuit is required to be equal to or higher than the lower limit voltage.

[Aspect 7]

If the engine 102 transits from the stop state to the operating state, the control circuit (for example, the CPU 121) stops supply of power from the power supply to the second conversion circuit. This is because if the engine 102 rotates, the generator 103 supplies power to the second conversion circuit. On the other hand, if the engine 102 transits from the operating state to the stop state, the control circuit (for example, the CPU 121) is configured to start supply of power from the power supply to the second conversion circuit.

The invention is not limited to the foregoing embodiments, and various variations/changes are possible within the spirit of the invention.

What is claimed is:

1. An engine generator comprising:
    an engine;
    a starter configured to start the engine;
    a power supply configured to supply power to the starter;
    a generator configured to be driven by the engine to generate power;
    an inverter including a first conversion circuit configured to convert an alternative current (AC) generated by the generator into a direct current (DC), and a second conversion circuit configured to convert the DC into an AC and supply the AC to a load;
    an outlet configured to output the AC from the inverter to the load;
    a control circuit configured to:
        obtain a load parameter which changes in response to connection state of the load to the outlet;
        stop the engine in accordance with the load parameter;
        cause the second conversion circuit to generate an AC by applying a DC voltage derived from the power supply to the second conversion circuit during a stop mode in which the engine does not rotate and the generator does not generate power;

maintain the engine in the stop mode based on the load parameter; and restart the engine based on the load parameter to transit from the stop mode to an operating mode in which the engine rotates and the generator generates power.

2. The engine generator according to claim 1, further comprising:

a third conversion circuit provided between the power supply and the second conversion circuit and configured to convert a DC voltage supplied from the power supply into a DC input voltage to the second conversion circuit such that the second conversion circuit can generate an AC from the DC input voltage during the stop mode; and a voltage detection circuit configured to detect, as the load parameter, the DC input a voltage supplied form the third conversion circuit to the second conversion circuit, and wherein the control circuit is configured to:

cause the second conversion circuit to receive the DC input voltage from the third conversion circuit converted form the DC voltage supplied from the power supply to generate the AC during the stop mode; and maintain the engine in the stop mode based on a change in the DC input voltage from the third conversion circuit to the second conversion circuit; and restart the engine based on the change in the DC input voltage from the third conversion circuit to the second conversion circuit.

3. The engine generator according to claim 1, further comprising a voltage detection circuit configured to detect, as the load parameter, a power supply voltage of the power supply, and wherein the control circuit is configured to:

maintain the engine in the stop mode based on a change in the DC voltage from the power supply; and restart the engine based on the change in the DC voltage from the power supply.

4. The engine generator according to claim 1, further comprising a third conversion circuit provided between the power supply and the second conversion circuit and configured to convert a DC voltage supplied from the power supply into a DC input voltage to the second conversion circuit such that the second conversion circuit can generate an AC from the DC input voltage during the stop mode; and a current detection circuit located between the third conversion circuit to the second conversion circuit, and configured to detect, as the load parameter, a current flowing from the third conversion circuit to the second conversion circuit, and wherein the control circuit is configured to;

cause the second conversion circuit to receive the DC input voltage from the third conversion circuit converted form the DC voltage supplied from the power supply to generate the AC during the stop mode;

maintain the engine in the stop mode based on a change in the current flowing from the third conversion circuit to the second conversion circuit; and restart the engine based on the change in the current flowing from the third conversion circuit to the second conversion circuit.

5. The engine generator according to claim 1, further comprising a current detection circuit located between the second conversion circuit and the outlet, and configured to detect, as the load parameter, a current flowing from the second conversion circuit to the load, and wherein the control circuit is configured to;

maintain the engine in the stop mode based on a change in the current flowing from the second conversion circuit to the load; and restart the engine based on the change in the current flowing from the second conversion circuit to the load.

6. The engine generator according to claim 3, further comprising a third conversion circuit provided between the power supply and the second conversion circuit and configured to convert a DC power supply voltage supplied from the power supply into a DC input voltage to the second conversion circuit during the stop mode, wherein the DC input voltage to the second conversion circuit is such DC voltage that the second conversion circuit can generate an AC by that the second conversion circuit is supplied with the DC input voltage.

7. The engine generator according to claim 1, wherein the control circuit is configured to stop, in a case where the engine transits from a stop state to an operating state, supply of power from the power supply to the second conversion circuit, and start, in a case where the engine transits from the operating state to the stop state, supply of power from the power supply to the second conversion circuit.

8. The engine generator according to claim 1, wherein the control circuit is configured to:

maintain the engine in the operating mode in a case where the load is being connected to the outlet;

maintain the engine in the operating mode in a case where the DC voltage of the power supply is not sufficient;

stop the engine in a case where the load is disconnected from the outlet and the DC voltage of the power supply is sufficient;

cause the power supply to supply the DC voltage to the second conversion circuit in a case where the engine is in the stop mode and the DC voltage of the power supply is sufficient;

restart the engine in a case where the load is connected to the outlet; and restart the engine in a case where the DC voltage of the power supply is not sufficient.

9. The engine generator according to claim 1, further comprising a switch located between the power supply and the second conversion circuit, wherein the controller is further configured to:

turn on the switch to apply the DC voltage derived from the power supply to the second conversion circuit during the stop mode; and turn off the switch to cut off the DC voltage derived from the power supply to the second conversion circuit during the operating mode.

* * * * *